Feb. 12, 1957　　　　B. H. KELLOGG　　　　2,780,939
WHEEL BALANCER
Filed Nov. 27, 1953　　　　　　　　　　　4 Sheets-Sheet 1
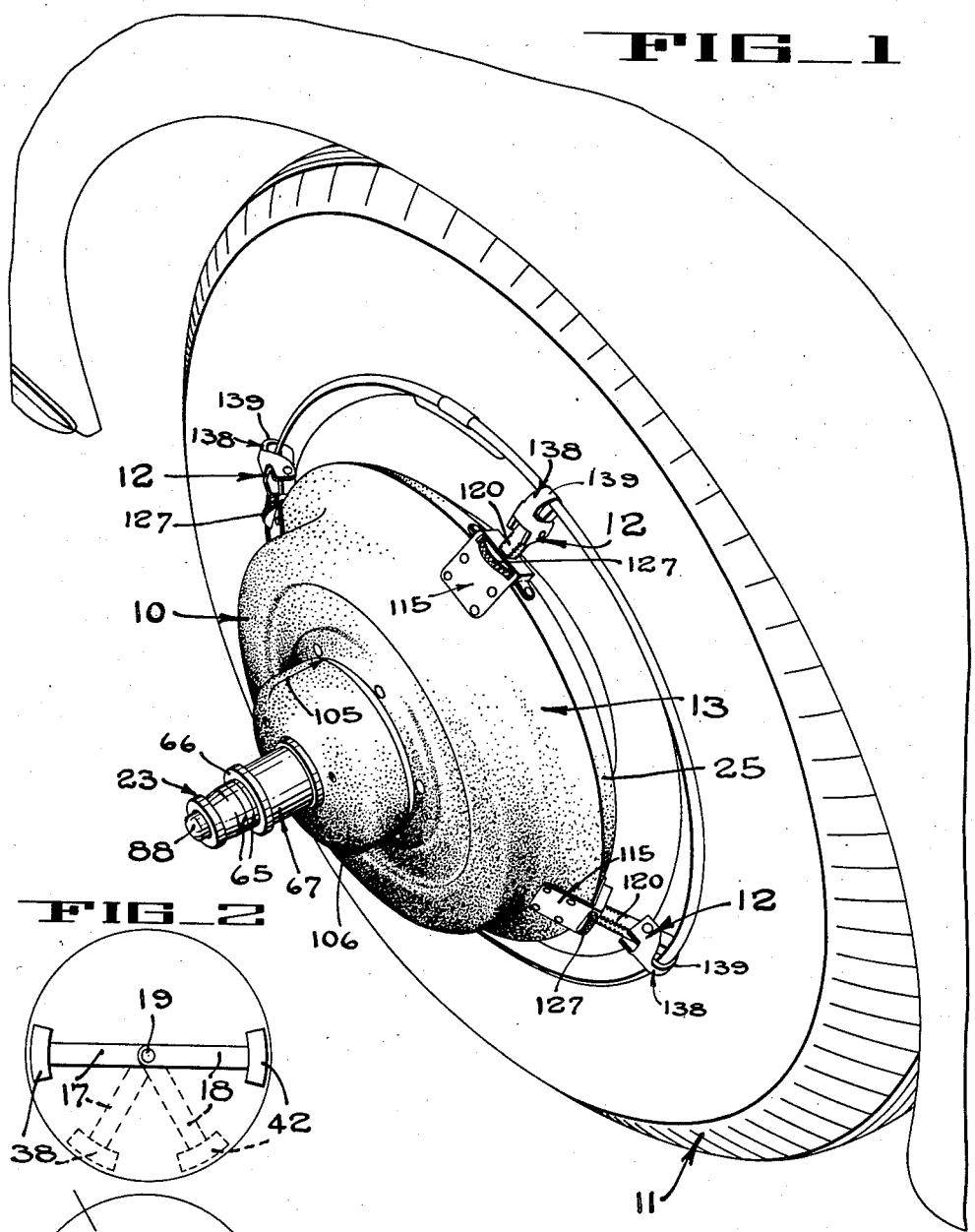
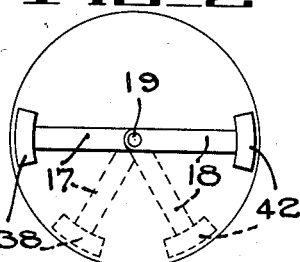
INVENTOR
BRUCE HOWARD KELLOGG, DECEASED,
BY HELEN JOHNSON KELLOGG, ADMINISTRATRIX.
BY
ATTORNEY

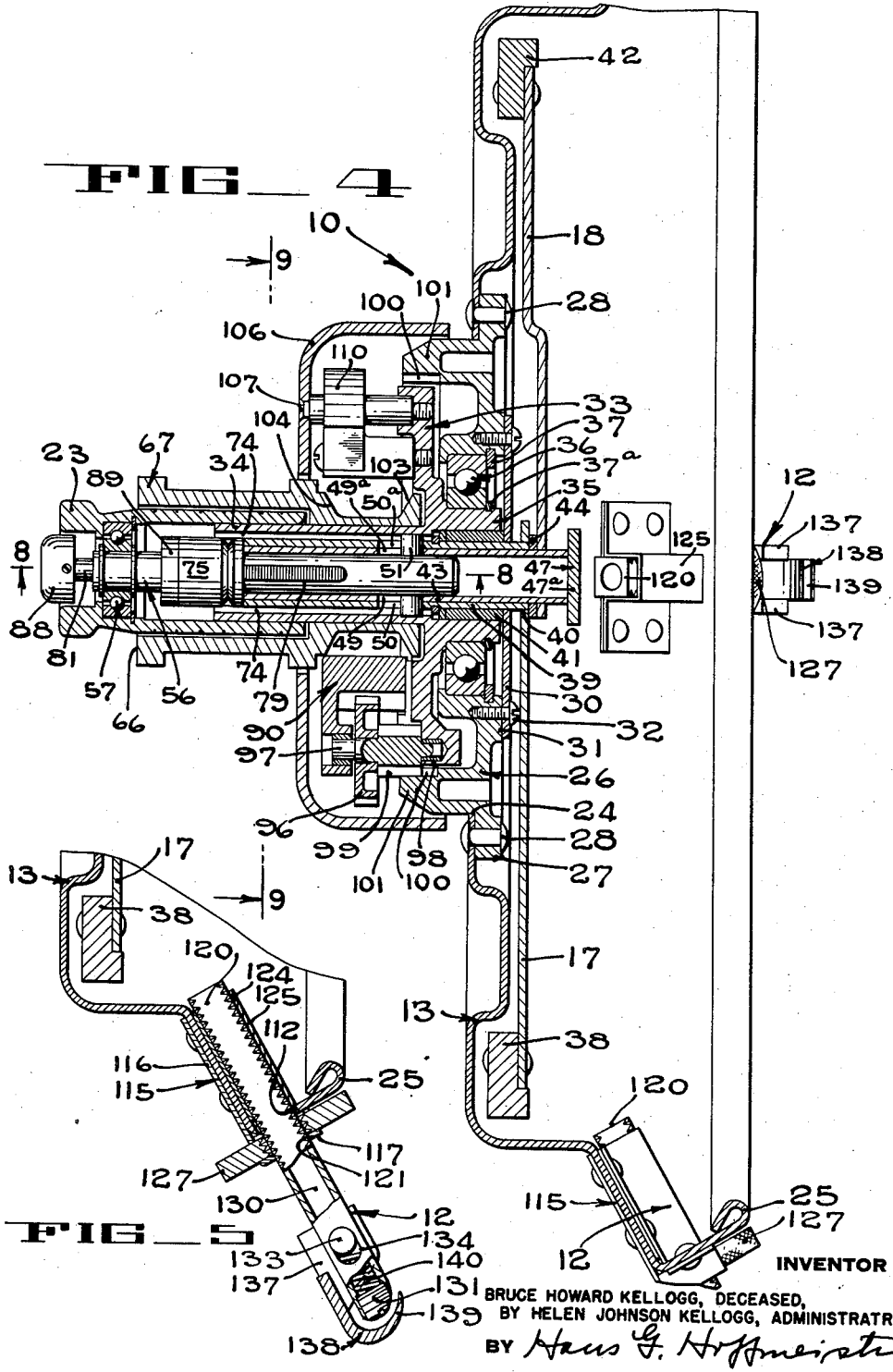

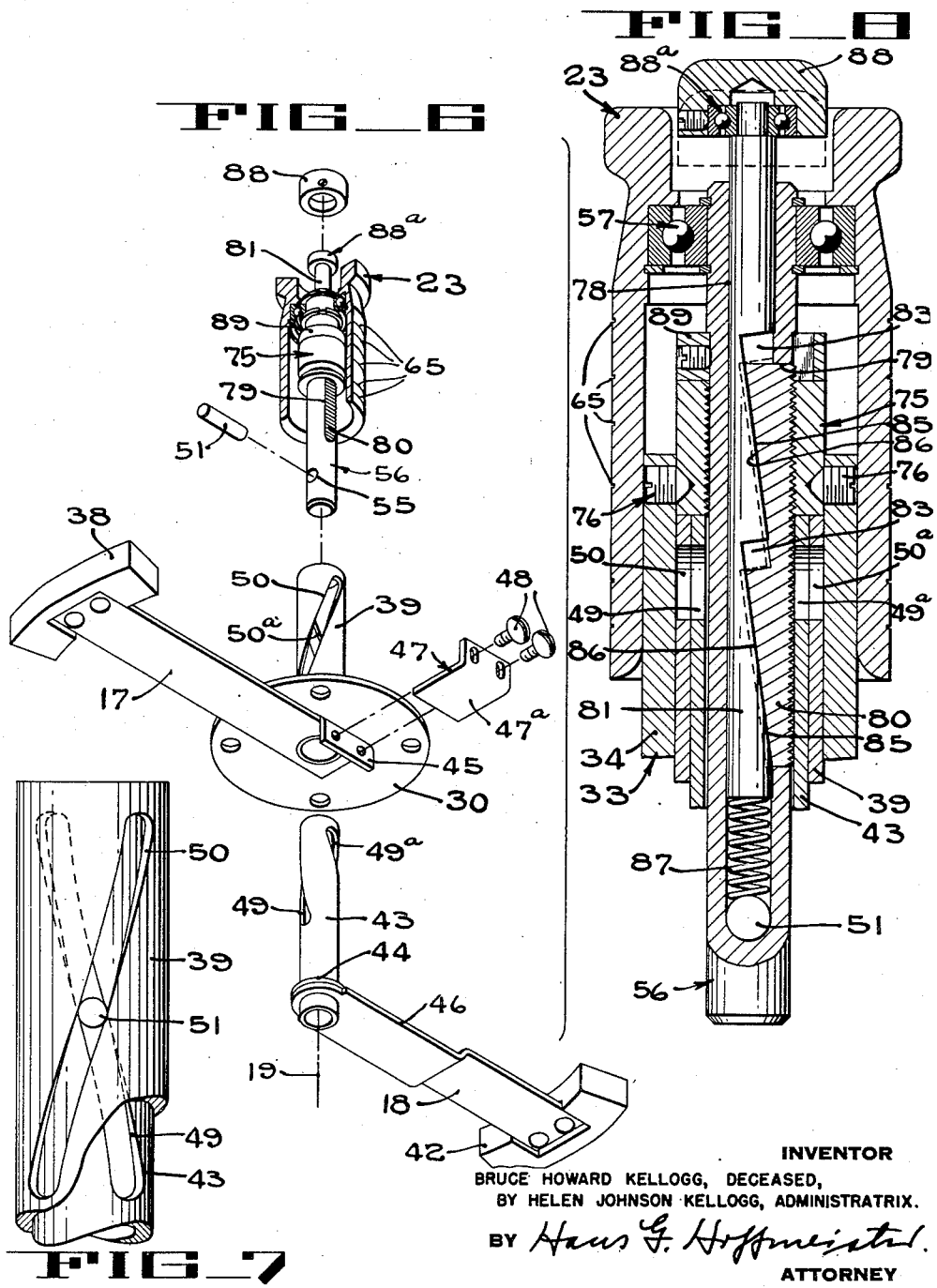

Feb. 12, 1957  B. H. KELLOGG  2,780,939
WHEEL BALANCER
Filed Nov. 27, 1953  4 Sheets-Sheet 4
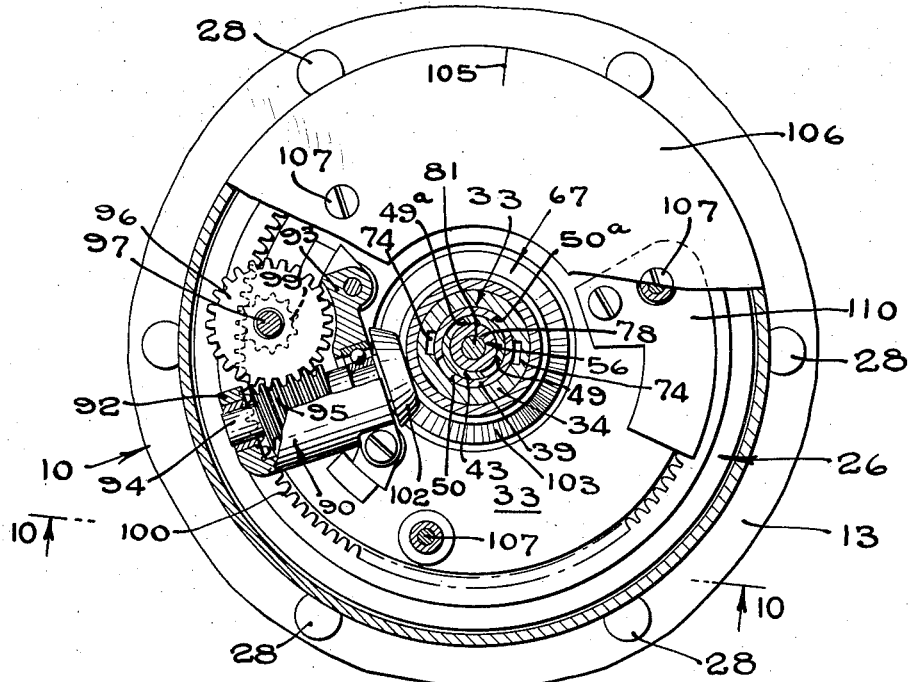
FIG_9
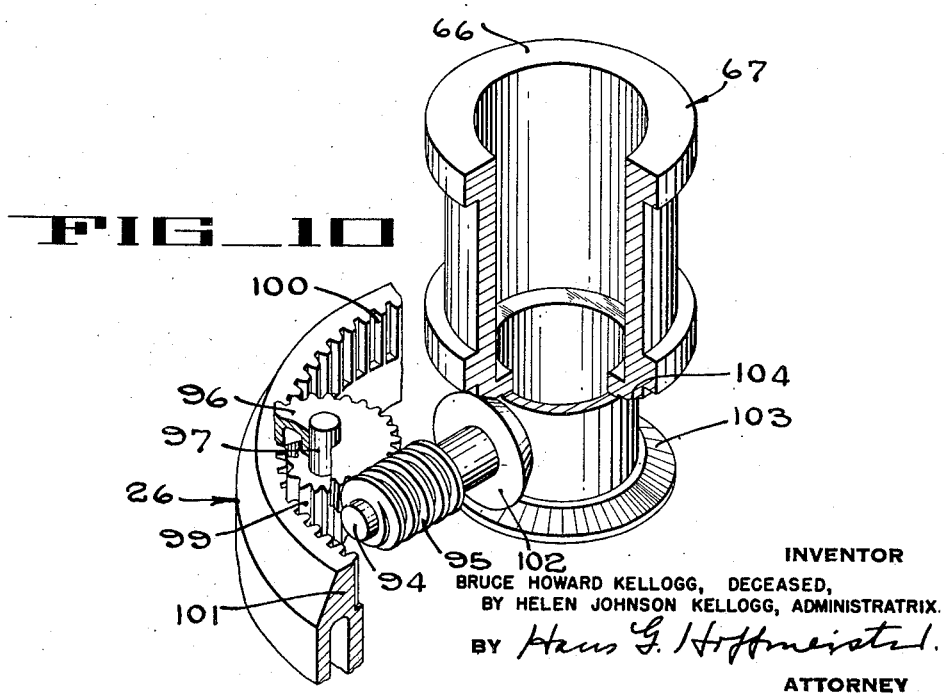
FIG_10
INVENTOR
BRUCE HOWARD KELLOGG, DECEASED,
BY HELEN JOHNSON KELLOGG, ADMINISTRATRIX.
BY Hans G. Hoffmeister
ATTORNEY

United States Patent Office 2,780,939
Patented Feb. 12, 1957

2,780,939
WHEEL BALANCER

Bruce Howard Kellogg, deceased, late of Los Gatos, Calif., by Helen Johnson Kellogg, administratrix, Santa Barbara, Calif., assignor to Food Machinery and Chemical Corporation, San Jose, Calif., a corporation of Delaware Application November 27, 1953, Serial No. 394,786

10 Claims. (Cl. 73—458)

This invention appertains to the balancing of rotating bodies and relates more particularly to an improved apparatus for testing the balance of vehicle wheels under operating conditions.

At present, automobile wheels are tested for unbalance conditions by removing each wheel from its spindle, mounting it on a rotatable arbor, and then testing the balance of the wheel while so mounted. Since considerable time and labor is involved in removing a wheel from a spindle, it is very desirable to be able to correct the unbalance of an automobile wheel without removing the wheel from the spindle.

It is an object of this invention to provide a balancing mechanism for testing the balance of a vehicle wheel while the wheel is mounted on the spindle of the vehicle and is rotated under substantially natural operation conditions.

Another object of this invention is to provide a balancing mechanism for accurately determining the location and amount of counterbalancing weights required to correct a condition of unbalance in a vehicle wheel.

Another object is to provide a compact balancing machine that may be mounted close against a vehicle wheel so that a minimum amount of floor space is required to perform the balancing operation.

Other and further objects and advantages of the present invention will become apparent from the following description taken in connection with the accompanying drawings in which:

Figure 1 is a fragmentary perspective of an automobile wheel on which a balancing mechanism, constructed in accordance with the teaching of the present invention, is mounted.

Figure 2 is a diagrammatic view indicating the movement of certain moving parts of the balancing mechanism during the balancing of a wheel.

Figure 3 is a diagrammatic view similar to Fig. 2 but showing a different operative movement of the moving parts of the balancing mechanism.

Figure 4 is a fragmentary section taken centrally through the balancing mechanism of the present invention.

Figure 5 is a fragmentary section, partly broken away, of one of the clamps used to secure the balancing mechanism to the rim of the automobile wheel prior to putting the balancing unit into operation.

Figure 6 is an exploded perspective, partly in section, of a weighted balance arm assembly of the balancing unit of the present invention.

Figure 7 is a side elevation of a part of the weighted balance arm assembly of Figure 6.

Figure 8 is a fragmentary section taken on line 8—8 of Figure 4.

Figure 9 is a fragmentary section, with parts broken away, taken on line 9—9 of Figure 4.

Figure 10 is a fragmentary perspective of a portion of the interior of the balancing unit, looking in the direction of arrows 10—10 of Figure 9.

A rotatable member, such as an automobile wheel, may be out of balance due to an uneven distribution of weight about the axis of rotation, or it may be out of balance due to an uneven distribution of weight outside the true plane of rotation of the rotatable member. In an automobile wheel, uneven distribution of weight may result from any one of several causes, such as the weight of the valve assembly, an extra thickness of tread at some particular point, or some other similar factor. When the wheel is rapidly rotated, the unbalance condition causes an excessive vibration in the wheel which is transferred to the vehicle. To place the wheel in balanced condition it is necessary to attach lead weights of proper size to the rim of the wheel at positions in which they are effective to counteract the particular condition of unbalance that is present.

In Figure 1 the reference numeral 10 indicates generally the wheel balancing unit of the present invention securely mounted on an automobile wheel 11 by four spaced clamps 12, which are carried by a dish-shaped cover 13 of the unit 10 and are arranged to center the unit relative to the axis of rotation of the wheel.

Assuming that the wheel 11 is out of balance due to one of the above-mentioned uneven weight distributions, it is necessary in correcting the unbalanced condition to first jack up the adjacent end of the vehicle until the wheel 11 is clear of the ground. A power driven wheel spinner (not shown), such as a standard electrically-driven wheel spinner, is applied to the tire 15 of the wheel 11 so that when the motor of the spinner is energized the wheel will be rotated at a predetermined speed. To correct the unbalance of the wheel, it is necessary to determine both the amount of unbalance and the location of unbalance, so that lead weights of proper amount may be secured to the rim of the wheel at the proper location. According to the present invention, these two factors are quickly and easily determined by a series of simple adjustments which involve two basic adjusting movements.

One adjustment, illustrated in Figure 2, consists of shifting two balance arms 17 and 18 relative to each other about a pivot axis 19 which is in alignment with the axis of rotation of the wheel. It is evident that, when the arms 17 and 18 are disposed 180° from each other, they balance each other. As they are shifted toward each other to a position indicated by the dotted lines, they have the effect of adding an increment of counterbalancing weight to the wheel on a radial line bisecting the angle between the arms. The amount of weight added in this manner is indicated on a scale which is calibrated to indicate ounces of weight and is disposed on the exterior of the unit, as will be explained hereinafter.

The second basic adjustment, shown diagrammatically in Figure 3, consists of subsequently shifting the arms 17 and 18 as a unit to determine the position at which the counterbalancing weight should be applied to be most effective. This position will correspond to the imaginary line 22 (Fig. 3) which bisects the angle between the arms in the adjusted, dotted line position. As will be explained more fully hereinafter, suitable indicia are provided on the exterior of the unit 10 to indicate this position.

For actual operation it is recommended that, after the unit 10 is secured on the wheel to be balanced, the balance arms 17 and 18 be shifted relative to each other as shown in Fig. 2 to preload the balancing unit 10 before the wheel is rotated by the wheel spinner. Then the wheel is rotated and the balancing arms are shifted as a unit as indicated in Fig. 3. As the arms are moved as a unit the vibration of the wheel is observed by means of any suitable vibration indicator (not shown) which may be attached to the fender of the automobile adjacent the wheel being tested. The unitary movement of the arms 17 and 18 is stopped when the vibration of the wheel is the least that can be obtained by this adjustment. Then, the first basic adjustment is repeated whereby the balancing arms 17 and 18 are shifted relative to each other again, as indicated in Figure 2, to add weight to the initial preloading weight or subtract weight therefrom, depending upon which adjustment further reduces vibration.

The first basic adjustment, which consists of moving the arms 17 and 18 toward each other, is made by pulling a knob 23 (Figure 4) outwardly of the cover or casing 13, or to the left as seen in Figure 4. The casing 13 is an annular sheet metal member having a central opening 24 and an inturned circular marginal lip 25. An upright ring-shaped base 26 is disposed in the opening 24 having an annular flange 27 overlapping the inner edge of the casing around the opening 24 and being secured to the casing 13 by rivets 28. An annular dust cover 30 is secured to a face 31 of the base 26 by screws 32. Since the casing 13 is rigidly secured to the rim of the wheel by the clamps 12 (Figure 1), the casing 13 and the base 26, which together form a unitary annular mounting plate, rotate with the wheel and are held in rigid position thereon during the testing operations. A circular support plate 33 is disposed in a plane parallel to the plane of the casing 13 and has one tubular, lateral projection 34 on which the knob 23 is slidably disposed, and a second tubular projection 35 which is rotatably journaled in a bearing assembly 36 that is held in position between the tubular portion 35 and the base 26 by means of snap rings 37 and 37a.

The balance arm 17 has a weight 38 secured to its radially outer end and carries, at its inner end, a tubular weight control shaft 39, one end of which is secured as by a press fit in an opening 40 on the inner end of the balance arm 17. The tubular shaft 39 extends laterally from the arm 17 through the annular dust cover 30 and through a sleeve bearing 41 that is disposed inside the cylindrical flange 35 of the support plate 33. The other balance arm 18 carries a weight 42 at its outer end and carries at its inner end a tubular weight control shaft 43 which is of a diameter to telescope inside the tubular shaft 39. The balance arms 17 and 18 and their attached tubular weight control shafts are shown in detail in Figures 6 and 7. In assembly, a spacer washer 44 is disposed around the shaft 43 and lies between the arms 17 and 18. An axially extending flange 45, formed on the arm 17, is disposed in a position to be contacted by a side edge 46 of the arm 18 as the arm 18 is swung in counterclockwise direction in Figure 6. When the arm 18 abuts the flange 45, the arms 17 and 18 are in the 180° aligned position in which they must be arranged before the initial testing adjustments are made. When the unit is assembled, a bracket 47 is secured to the flange 45 by screws 48, with a wall portion 47a disposed alongside the end of the tubular shaft 43 to prevent axial movement of the shaft 43 relative to the shaft 39. The tubular shaft 43 is provided with two longitudinally extending spiral grooves 49 and 49a. The tubular shaft 39 also has two longitudinally extending spiral grooves 50 and 50a. The grooves 49 and 49a in the shaft 43 spiral in one direction while the grooves 50 and 50a of the shaft 39 spiral in the opposite direction. Thus, it will be seen that, with a pin 51 (Figure 7) which extends transversely through both sets of grooves 49, 49a and 50, 50a is moved longitudinally of the shafts 39 and 43, the outer control shaft 39 will be rotated in one direction while the inner control shaft 43 will be rotated in the opposite direction. The pin 51 is positioned at the right hand, inner end of the slots 49, 49a and 50, 50a, as seen in Figure 4, when the balance arms 17 and 18 are disposed in the initial 180° aligned relation. Accordingly, to swing the arms 17 and 18 toward each other during the adjustment shown in Figure 2, it is only necessary to move the pin 51 in a direction outwardly of the unit 10, or to the left as seen in Figure 4.

The pin 51 is actuated by movement of the knob 23 through a plunger 56 (Figure 8) on the upper end of which the knob 23 is rotatably mounted by means of a ball bearing assembly 57. The plunger 56 is mounted for sliding movement in a direction axially of the shafts 39 and 43. When the unit is assembled, the pin 51 extends through the slots 49, 49a and 50, 50a and through a transverse opening 55 in the plunger 56. As the knob 23 and the plunger 56 are moved outwardly of the casing, the balance arms 17 and 18 are swung toward each other while, when the plunger 56 is moved axially inwardly, the arms 17 and 18 are returned to their 180° initial position. As mentioned before, the angular movement of the arms 17 and 18 toward each other is a direct measure of the amount of weight added to the wheel. Therefore, for any set of weighted balance arms, the distance the knob 23 is moved outwardly can be calibrated in ounces of weight added, and annular grooves 65 (Figure 8) may be cut in the knob 23 to indicate the weight in ounces corresponding to each setting of the balance arms. The outer edge 66 of a second knob 67 (Figure 4) that is stationary during the initial adjustment, may be used as a reference point.

In each adjusted position, the balancing arms 17 and 18 are locked on a collar 75 (Fig. 8) disposed around the plunger 56 and secured, by setscrews 76, inside the upper end of the tubular extension 34 of the support plate 33. The tubular extension 34 has a pair of diametrically opposite, longitudinally extending grooves 74 (Fig. 4) adapted to receive the opposite ends of the pin 51 to guide the pin in its movement axially in the hollow shafts 39 and 43. The plunger 56 (Figure 8) has a central opening 78 extending from the top of the plunger down to the transverse slot 55 which holds the pin 51. The plunger 56 also has a longitudinal slot 79 extending through one side wall and adapted to retain a clutch element 80 in sliding relation. A clutch pin 81 is slidably disposed in the central opening 78 of the plunger. This clutch pin has two cutout portions 83, each of which has a slanted inner wall 85 arranged to mate with similarly slanted side edges 86 of the clutching element 80. A compression spring 87 is disposed in the central opening of the plunger 56 between the transverse pin 51 and the lower end of the clutch pin 81. The spring normally urges the clutch pin upwardly, camming the clutch element 80 radially outwardly of the pin 81 through the slot 79 into engagement with the inner surface of the stationary collar 75. The outer edge of the clutching element 80 may be serrated, or have a threaded configuration, to grippingly engage a similar surface on the interior wall of the collar 75. With the clutching element 80 spring-urged into engagement with the collar 75, the balance arms 17 and 18 are held in an adjusted position corresponding to the position of the plunger 56 relative to the collar 75. When the clutch pin 81 is moved inwardly of the casing 13 by pressing a button 88 which is rotatably mounted on a bearing assembly 88a on the outermost end of the pin 81, the spring 87 is compressed, permitting the clutching element 80 to move radially inwardly to disengage the collar 75 and permitting sliding movement of the plunger 56 relative to the collar 75. A second collar 89 secured to the plunger 56 is arranged to abut the outer surface of the collar 75 to define the innermost position of the plunger 56 and the pin 51 mounted therein, relative to the casing 13 which position will correspond to the 180° disposition of the balance arms 17 and 18. Therefore, in making the initial adjustment of Figure 2, the operator first presses the button 88 of the clutch pin 81 to release the clutching element 80 and then, while holding the pin in the de-clutched position, he moves the knob 23 axially to shift the balance arms toward each other and to preload the balancer. When the clutch pin button 88 is released, the spring 87 moves the clutch parts to engaged position, locking the arms 17 and 18 in fixed position relative to the rotatable support plate 33. It is to be noted that, while the initial adjustment of the balance arms toward each other is made while the wheel is stationary, subsequent relative adjustment of the arms is made while the wheel is rotating. This is made possible by the rotatable mountings of the knob 23 and the button 88.

The second adjustment, which is illustrated in Figure 3, is made by moving the arms 17 and 18 as a unit to determine the most advantageous position to apply the amount of weight with which the unit was preloaded by the first adjustment. This is accomplished by rotating the support plate 33 on which the arms 17 and 18 are locked. In Figure 9, a bracket 90 is shown secured to the outer face of the support plate 33 by setscrews 91. The bracket 90 has spaced wall portions 92 and 93 which journal a shaft 94 on which a worm 95 is keyed. The worm 95 is in mesh with a worm wheel 96 keyed to a shaft 97 which, as shown in Fig. 4, has one end journaled in the upper wall of the bracket 90 and the other end journaled in a recess 98 in the support plate 33. A gear 99 is keyed to the shaft 97 at a point between the support plate 33 and the worm wheel 96 and is in mesh with an internal gear 100 (Figures 9 and 10) formed on an inwardly projecting flange 101 of the annular support plate 33. The worm shaft 94 carries a friction cone 102 in keyed relation at one end. The cone is arranged for selective frictional engagement with opposed beveled contact surfaces 103 and 104 (Figure 10) of the control knob 67 which is rotatably mounted, as seen in Figure 4, on the tubular lateral extension 34 of the support plate 33. If the control knob 67 is moved to the left, as seen in Figure 4, the beveled surface 103 will contact the friction cone 102 and if the knob 67 is moved to the right, the beveled surface 104 will contact the friction cone 101. After the cone 102 is in engagement with one of the beveled surfaces, the operator holds the knob 67 in stationary position relative to the rotating wheel and the unit 10 which is rotating with the wheel. Since rotation of the unit 10 causes rotation of the base 26 and the support member 33, the cone 102, which is mounted in the bracket 90 secured to the support plate 33, is rolled along the beveled friction surface of the stationary knob 67, causing rotation of the worm shaft 94. As the shaft is rotated, the gear 99 will "walk" around the internal gear 100 carrying the bracket 90 and the support plate 33 therewith in a rotary direction, clockwise or counterclockwise depending upon which beveled surface is engaged with the friction cone 102. Since the balance arms 17 and 18 are locked on the support plate 33 they will be shifted as a unit with the support plate 33 in an angular direction. Thus, the second adjustment is made by holding one friction surface of the control knob 67 in engagement with the cone 102 while the wheel is rotated.

The position of the bisecting line 22 (Fig. 3) is indicated exteriorly of the casing 13 by means of an arrow 105 (Figs. 1 and 9) engraved on the exterior surface of a cover 106 which is secured to the support plate 33 by three cap screws 107. It will be noted in Figure 4 that the pin 51 slides back and forth in the grooves 74 of the tubular extension 34 of the support plate 33. It is also to be noted that when the pin 51 is at the base of the spiral grooves in the shafts 39 and 43, the arms 17 and 18 are in their 180° relation, refining a line parallel to the pin 51. Accordingly the opposed grooves 74 define the 180° position of the balancing arms 17 and 18 and therefore the arrow 105 (Fig. 9), which is disposed at 90° to a line through the grooves 74, will always indicate the bisector of the angle between the arms 17 and 18.

A counterweight 110 (Fig. 9) is mounted on the rotatable support plate 33 to balance the weight of the bracket 90 and the associated mechanism.

In Figure 5 a detail of one of the clamps 12 is shown. The clamp comprises an L-shaped bracket 115 having an arm 116 riveted to the outer face of the casing 13 and an arm 117 extending generally parallel to the in-turned lip 25 of the casing 13. An elongated adjusting pin 120, that is square in cross-section and has a screw thread formed on its corner edges, extends through an opening 121 in the bracket leg 117 and through an opening 112 in the lip 25 of the casing. Inside the casing, the adjusting pin 120 is guided in a square guide passage 124 formed in a bracket 125 secured to the inner face of the casing 13 by the same rivets that hold the bracket 115 to the outer surface of the casing. A nut 127 is threaded on the pin 120 and is disposed between the casing lip 25 and the leg 117 of the bracket 115. Turning of the nut 127 causes the adjusting pin 120 to be moved in or out of the casing 13. The adjusting pin 120 has a central longitudinal bore 130 which is internally threaded at one end and fitted with a plug 131. A pin 133 extends through aligned slots 134 in the opposite sidewalls of the adjusting pin 120. The pin 133 also extends into suitable openings (not shown) in opposite flanges 137 of a bracket 138. The bracket 138 carries, at its forward end, a hook-shaped member 139 which conforms to the configuration of the end of the adjusting pin 120 and is disposed closely adjacent thereto. A spring 140 is disposed in the bore 130 of the adjusting pin 120 between the pin 133 and the plug 131 and normally urges the pin 133 toward the rearward ends of the slots 134 to move the hook 139 toward the end of the adjusting pin. When the hook is being engaged over the rim of the wheel, the spring permits the hook to be moved away from the pin 120 to accommodate itself to the rim and then the spring resiliently holds the hook in the engaged position. Four clamp assemblies 12 are mounted on the casing 13 and, since they all contain adjusting nuts 127, the casing 13 may be accurately centered on the rim before the testing operation is begun.

To determine whether or not a condition of unbalance is present in an automobile front wheel, a jack is placed under the front center of the car and both front wheels are raised off the floor. A wheel spinner is applied to the tire of the wheel to be tested and the spinner is energized to begin rotation of the wheel. When the wheel reaches a speed of from 70 to 80 M. P. H., or a lower speed at which excessive vibration is evident, the spinner is moved away from the wheel, permitting the wheel to run free. If the fender or bumper of the car vibrates, the vibration indicates an out of balance condition which must be corrected.

The first step in correcting the unbalance of the wheel consists in removing all old counterbalancing weights from the wheel and mounting a vibration indicator on the fender or the bumper in a convenient position. The balancing unit 10 is then mounted on the rim of the wheel by means of the clamps 12 and is centered relative to the spindle by manipulating the adjusting nuts 127 of the clamps 12. A centering gauge (not shown) may be attached to the adjacent fender of the car to aid in centering the balance unit. Such centering gauges are provided with a pointer which may be suspended in a position close to an annular surface, such as the annular side face of the cover 106, which is concentric with the spindle. When the wheel is slowly rotated by hand, the pointer will indicate whether or not the unit is accurately centered.

After the unit 10 has been accurately centered, the clutch pin button 88 is pressed inwardly of the casing 13 to disengage the clutch element 80. While the clutch is disengaged, the knob 23 is pulled outwardly a short distance to swing the balance arms toward each other to preload the balancing unit 10 with an increment of counterbalancing weight. The clutch pin button 88 is then released and the wheel spinner is applied to the tire of the wheel to start rotation of the wheel. The speed of rotation is gradually increased until the vibration indicator shows an excessive vibration. While the wheel is rotating, the control knob 67 is moved inwardly or outwardly of the casing 13 to shift the balance arms 17 and 18 as a unit until the vibration smooths out. At this point the clutch pin button 88 is pressed in once more and the knob 23 is actuated to swing the balance arms relative to each other until the vibration is at a minimum. The wheel is then rotated at a higher speed and if any vibration remains, the balance arms are readjusted until the vibration is eliminated. In this manner the unbalance of the wheel is corrected throughout the range of operating speed of the vehicle.

When a condition of minimum vibration is obtained, the amount of weight to be added is indicated by the calibrated grooves 65 on the knob 58 and the location at which this amount of weight should be applied is indicated by the arrow 105 on the outside of the cover 106. This location can be readily transferred to the rim of the wheel by use of an appropriate straight edge, such as a ruler. A lead weight in the indicated amount can be crimped onto the rim at the proper location in the well known manner.

The knob 58 may be calibrated so that each groove indicates one-half ounce of weight to be added. When 4 or more ounces are indicated, better balance can usually be obtained if weights equal to 2½ or 3 ounces are placed at the location indicated but on the inside of the wheel while the unit 10 is still mounted on the wheel. The entire balancing operation is then repeated and the new indicated weight is placed on the outside of the wheel at the newly indicated position.

When the balancing operation has been completed and the weight, or weights, have been applied as indicated, the wheel will be in static and dynamic balance. A final check of the balance of the wheel may be made by removing the unit 10, and rapidly rotating the wheel by means of the spinner. No vibration should be evident throughout the entire speed range of the vehicle when the wheel is in balanced condition.

The unbalanced condition of the rear wheels of an automobile may be corrected in substantially the same manner as described for correcting the unbalance of front wheels. However, a wheel spinner is not necessary since, after the rear end of the car is raised off the floor, the engine of the car may be used to drive the rear wheel that is being tested.

From the foregoing description, it will be seen that this invention provides a compact, efficient balancing unit which is particularly adapted for determining the out-of-balance conditions of an automobile wheel. The use of balance arms movable in a plane between the cover of the unit and the wheel being tested provides a compact unit which extends a very short distance from the hub of the wheel. The novel clutch assembly of the present invention positively locks the balance arms in adjusted position, thus preventing the undesirable gravitational movement of the arms which is possible when only the frictional resistance of the adjusting mechanism is used to prevent this movement. The novel arrangement of the clutch-control button inside the weight control knob permits accurate one-handed adjustment of the balance arms while the rest of the balancing unit is rotating with the wheel. While this improved balancing machine is extremely accurate in determining the amount and position of the unbalance of a wheel, the operations involved are so simple and clearly defined as to permit accurate operation of the machine by one unfamiliar with dynamic balancing principles.

It will be understood that modifications and variations may be made without departing from the scope of the present invention.

Having thus described the invention, what I claim as new and desire to protect by Letters Patent is:

1. A balancing machine comprising an apertured mounting member adapted to be secured to a rotatable body for rotation therewith about the axis of the body, an annular support plate rotatably mounted on said mounting plate for rotation about the axis of said body, weight means adjustably mounted on said support plate, means for shifting said weight means relative to said support plate to change the distribution of weight of said support plate, a releasable clutch operatively connected between said weight shifting means and said support plate, spring means for urging said clutch into clutching engagement with said support plate for positively locking said weight means on said support plate, and means for shifting said support plate and said weight means as a unit relative to said mounting plate to change the distribution of weight of said mounting plate when said clutch is engaged.

2. A balancing machine comprising a mounting member adapted to be secured on a rotatable body for rotation therewith about the axis of the body, a support plate mounted in said mounting member for rotation about the axis of rotation of said body, weight means mounted on said support plate for conjoint rotation therewith and for rotational adjusting movement relative thereto, a control member mounted for movement along the axis of rotation of said wheel, clutch means normally locking said control member to said support plate to prevent axial movement of said control member, means for releasing said clutch means, means for moving said control member in an axial direction when said clutch is released, and means connecting said control member to said weight means to effect pivotal adjusting movement of said weight means as said control member is moved in an axial direction.

3. A balancing machine comprising a mounting plate adapted to be secured to a rotatable body for rotation therewith about the axis of the body, a pair of balance arms mounted on said mounting plate for pivotal adjusting movement relative to each other about the axis of rotation of the rotatable body, a control member supported by said mounting plate and arranged for adjusting movement along the axis of rotation of the body, means connected said control member to said balance arms and arranged to change axial movement of said control member to pivotal movement of said balance arms, a releasable clutch disposed between said control member and said mounting plate, and spring means urging said clutch into clutching engagement with said mounting plate to lock said arms in selected adjusted position on said plate.

4. A balancing machine comprising an annular mounting plate adapted to be secured to a rotatable body for rotation therewith, a pair of balance arms disposed for adjusting movement in a plane between said mounting plate and said body, tubular actuating members secured to said balance arms and extending through said mounting plate in a direction transverse to the plane of movement of said balance arms, each of said tubular members having grooves therein, a control member supported by said mounting plate and arranged for movement along the axis of said rotating body, and a member received by said grooves and actuated by said control member to effect pivotal adjusting movement of said balance arms as said control member is shifted axially.

5. A balancing machine comprising a mounting plate adapted to be secured on a rotatable body for rotation therewith, a support plate rotatably mounted in said mounting plate, the axis of rotation of said support plate being disposed on the axis of rotation of said body, balancing means adjustably mounted on said support plate including a weighted portion adjustably movable about the axis of said support plate, an adjusting tube mounted in said support plate for rotation about the axis of said support plate and means connecting said tube to said weighted portion so that rotation of said tube causes adjusting movement of said weighted portion, a reciprocable actuating rod movable along the axis of said tube, and means for changing axial movement of said rod to rotary movement of said adjusting tube to adjust the weighted portion of said balancing means relative to said support plate.

6. A balancing machine comprising a mounting plate adapted to be secured to a rotating body for rotation therewith, a support plate mounted on said mounting plate for rotation about the axis of rotation of the body, said support plate having a tubular portion projecting along the axis of rotation, a collar secured to the free end of said tubular portion, a rod extending through said collar and arranged for sliding movement therein along said axis of rotation, resilient means for clamping said rod to said collar, a pair of telescoping tubes disposed inside the tubular projection of said support plate, said tubes having aligned spiral grooves, a pin on said rod extending through said grooves to abut the walls of said spiral grooves and effect rotation of said tubes as said pin is moved in an axial direction, the groove in one tube being oppositely spiralled relative to the groove in the other tube whereby axial movement of the pin causes rotation of said tubes in opposite directions, a balance arm secured on the end of each of said tubes, and means for releasing the clamping engagement of said rod with said collar to permit axial adjustment of said rod relative to said rotating support plate.

7. A balancing machine comprising a mounting plate adapted to be mounted on a rotatable body for rotation therewith, weight means mounted on said mounting plate and arranged for swinging movement about the axis of rotation of said body, a control member mounted for sliding reciprocating movement along the axis of rotation of said body, means connecting said control member to said weight means to effect angular movement of said weight means as said control member is shifted axially, and a cap rotatably mounted on said control member permitting said control member to rotate with said mounting plate while said cap is held against rotation during the axial adjustment of said control member.

8. In a machine for balancing a rotary body, a weight distributing mechanism comprising a support plate adapted to be supported from the rotary body and having an opening coaxial with the axis of rotation of the body, an adjusting tube having a groove therein and journalled for rotation in said opening, a weight arm secured to said tube and disposed for rotary movement in a plane normal to the axis of rotation of the body, a control member mounted on said support plate for movement along the axis of rotation, and a member received by said groove and impelled by said control member to effect pivotal adjusting movement of said weight arm relative to said support plate as said control member is moved in an axial direction.

9. In a machine for balancing a rotary body, a weight distributing mechanism comprising a support plate adapted to be supported from the rotary body and having an opening coaxial with the axis of rotation of the body, a tube journalled for rotation in said opening, a weight arm secured to said tube and disposed for rotary movement in a plane normal to the axis of rotation of the body, a control member mounted on said support plate for movement along the axis of rotation, a releasable clutch operatively connected between said support plate and said control member and arranged when engaged to lock said control member to said plate, means for releasing said clutch to permit movement of said control member in the axial direction, and means connecting said control member to said tube to effect pivotal adjusting movement of said weight means relative to said support plate as said control member is moved in the axial direction.

10. A balancing machine comprising a support plate adapted to be mounted on a rotary body for rotation therewith and having a tubular portion extending along the axis of rotation, balancing means adjustably mounted on said support plate including a weighted portion adjustably movable about the axis of said support plate, an adjusting tube mounted inside the tubular portion of said support plate for rotation about the axis of said support plate, means connecting said adjusting tube to said weighted portion so that rotation of said adjusting tube causes adjusting movement of said weighted portion, a reciprocable tubular actuating shaft movable along the axis of said adjusting tube, said shaft having a longitudinal slot therein, a clutch element mounted in said slot for movement into gripping engagement with the inner surface of the tubular portion of said support plate, a pin slidable in said tubular actuating shaft and arranged to engage said clutch element and urge it into said gripping engagement with said tubular portion, spring means normally urging said pin into engagement with said clutching element, means for disengaging said clutch element from said tubular portion, and means for changing axial movement of said tubular shaft to rotary movement of said adjusting tube to adjust the weighted portion of said balancing means relative to said support plate when said clutching element is disengaged.

References Cited in the file of this patent

UNITED STATES PATENTS

| | | |
|---|---|---|
| 2,241,637 | Ernst et al. | May 13, 1941 |
| 2,547,764 | Lindenberg et al. | Apr. 3, 1951 |
| 2,675,200 | Wohlforth | Apr. 13, 1954 |